United States Patent
Day

(10) Patent No.: US 7,314,141 B1
(45) Date of Patent: Jan. 1, 2008

(54) FOLDING BELT FILTER

(76) Inventor: Paul Hedley Day, 25 Myrtle Avenue, Myrtle Bank, South Australia 5064 (AU)

(*) Notice: Subject to any disclaimer, the term of this patent is extended or adjusted under 35 U.S.C. 154(b) by 0 days.

(21) Appl. No.: 10/204,365

(22) PCT Filed: Aug. 6, 1998

(86) PCT No.: PCT/AU98/00619

§ 371 (c)(1),
(2), (4) Date: Apr. 24, 2003

(87) PCT Pub. No.: WO99/07457

PCT Pub. Date: Feb. 18, 1999

(51) Int. Cl.
B01D 33/052 (2006.01)
B01D 33/056 (2006.01)
B01D 33/64 (2006.01)
B30B 9/20 (2006.01)
B30B 9/24 (2006.01)

(52) U.S. Cl. .................... 210/400; 210/386; 210/401; 210/503; 210/770; 210/783; 100/119; 100/120; 100/153

(58) Field of Classification Search ............... 210/770, 210/780, 386, 387, 350, 359, 400, 783, 401; 100/119, 120, 37
See application file for complete search history.

(56) References Cited

U.S. PATENT DOCUMENTS

| 258,349 | A | * | 5/1882 | Bard ........................... 100/151 |
| 271,387 | A | * | 1/1883 | Wilcox ......................... 100/96 |
| 358,989 | A | * | 3/1887 | Sanor .......................... 100/97 |
| 432,153 | A | * | 7/1890 | Whiting ........................ 100/96 |
| 457,217 | A | * | 8/1891 | Rohrer ......................... 100/152 |
| 502,523 | A | * | 8/1893 | Lockstaedt .................... 100/151 |
| 1,350,788 | A | * | 8/1920 | Day ............................ 100/120 |
| 1,457,755 | A | * | 6/1923 | Smith .......................... 100/120 |
| 1,659,733 | A | * | 2/1928 | Harbeck ....................... 100/154 |
| 1,833,497 | A | * | 11/1931 | Prouty ........................... 34/59 |
| 2,261,043 | A | * | 10/1941 | Winfree, Jr. .................. 425/328 |
| 2,313,702 | A | * | 3/1943 | Allen .......................... 29/17.1 |
| 2,621,573 | A | * | 12/1952 | Katzen et al. ................. 396/603 |
| 2,796,810 | A | * | 6/1957 | Muller ......................... 162/290 |
| 3,169,922 | A | * | 2/1965 | Hornbostel .................... 210/387 |
| 3,338,383 | A | * | 8/1967 | Hashimoto .................... 198/819 |
| 3,530,791 | A | * | 9/1970 | Flotte ......................... 100/120 |
| 3,625,141 | A | * | 12/1971 | Braun ......................... 100/119 |
| 3,630,158 | A | * | 12/1971 | Doornhof ...................... 100/58 |
| 3,654,074 | A | * | 4/1972 | Jaquelin ....................... 162/213 |
| 3,782,272 | A | * | 1/1974 | Cooper ....................... 99/450.7 |
| 3,801,250 | A | * | 4/1974 | Kaiser et al. ................. 425/224 |
| 3,805,692 | A | * | 4/1974 | Fischer ........................ 100/120 |

(Continued)

FOREIGN PATENT DOCUMENTS

EP    1009511 A1 * 6/2000

(Continued)

Primary Examiner—Robert James Popovics
Assistant Examiner—Tereas Woodruff
(74) Attorney, Agent, or Firm—Dalina Law Group, P.C.

(57) ABSTRACT

A belt filter for effecting separation of liquid from solids where, at the collection zone, a filter belt or belts is changed shape so as to provide a supporting shape to bold liquid, which is then fed into a nipping zone. In an embodiment there is a single belt used which is folded in a middle portion to provide the supporting shape.

9 Claims, 9 Drawing Sheets

U.S. PATENT DOCUMENTS

| | | | | |
|---|---|---|---|---|
| 3,906,853 | A | * | 9/1975 | Wohlfarter .................. 100/118 |
| 3,914,080 | A | * | 10/1975 | Kamp ....................... 425/83.1 |
| 3,951,809 | A | * | 4/1976 | Kollmar ....................... 210/241 |
| 4,017,398 | A | * | 4/1977 | Hartmann et al. .......... 210/350 |
| 4,039,450 | A | * | 8/1977 | Brown ....................... 210/783 |
| 4,111,801 | A | * | 9/1978 | Jay et al. .................... 210/671 |
| 4,131,546 | A | * | 12/1978 | Olsson et al. ............... 210/771 |
| 4,157,065 | A | * | 6/1979 | Schinko ....................... 100/45 |
| 4,229,202 | A | * | 10/1980 | Mullerheim et al. ............. 71/8 |
| 4,260,496 | A | * | 4/1981 | Beer ........................... 210/780 |
| 4,410,390 | A | * | 10/1983 | Farrell ........................ 156/461 |
| 4,480,800 | A | * | 11/1984 | Oberg et al. ................ 242/535 |
| 4,501,669 | A | * | 2/1985 | Hakansson et al. ......... 210/770 |
| 4,518,507 | A | * | 5/1985 | Conner ....................... 588/252 |
| 4,681,688 | A | * | 7/1987 | Sondov et al. .............. 210/770 |
| 4,775,472 | A | * | 10/1988 | Lucis .......................... 210/386 |
| 5,433,851 | A | * | 7/1995 | Itoh ............................ 210/386 |
| 5,439,598 | A | * | 8/1995 | Clough ....................... 210/770 |
| 5,520,824 | A | * | 5/1996 | Sasaki ......................... 210/780 |
| 5,725,783 | A | * | 3/1998 | Hoden ......................... 210/770 |
| 6,146,540 | A | * | 11/2000 | Nakamura et al. .......... 210/745 |
| 6,190,569 | B1 | * | 2/2001 | Parker ......................... 210/770 |
| 6,190,570 | B1 | * | 2/2001 | Nakamura et al. .......... 210/776 |
| 6,221,265 | B1 | * | 4/2001 | Hoden ......................... 210/770 |
| 6,241,900 | B1 | * | 6/2001 | Nakamura et al. .......... 210/769 |
| 6,248,245 | B1 | * | 6/2001 | Thompson .................. 210/783 |
| 6,273,270 | B1 | * | 8/2001 | Nakamura et al. .......... 210/386 |
| 6,454,102 | B2 | * | 9/2002 | Thompson .................. 210/386 |
| 6,508,965 | B1 | * | 1/2003 | Webb ......................... 264/118 |
| 6,555,013 | B2 | * | 4/2003 | Nakamura et al. .......... 210/769 |
| 2001/0054592 | A1 | * | 12/2001 | Day ........................... 210/783 |

FOREIGN PATENT DOCUMENTS

| | | | |
|---|---|---|---|
| JP | 46-40989 | * | 3/1969 |
| WO | WO 9907457 A1 | * | 2/1999 |

* cited by examiner

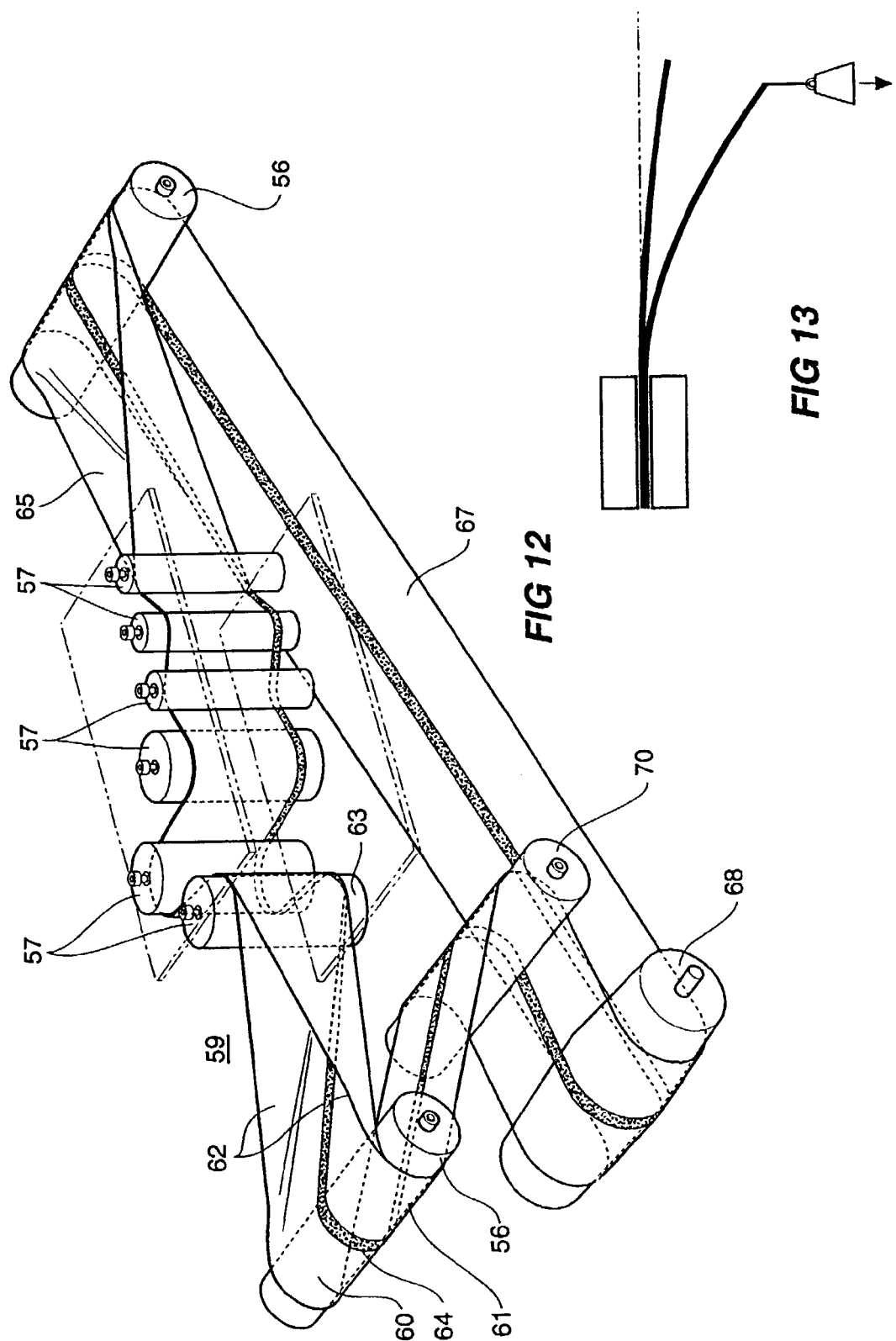

FOLDING BELT FILTER

The present invention relates to a belt filter system for separation of material into liquid and solid components, a belt adapted for this purpose and a method for effecting some separation of solid and liquid components, and a method to assisting drying of sludge or slurry like materials.

BACKGROUND ART

Many industrial and commercial processes require the separation of a sludge or slurry into its component liquid and solid. This may be used to treat a sludge or slurry so as to remove a percentage of its liquid, or to produce a liquid with less solid particulate, or both. Some examples of such sludge or slurry to be so treated include sewage, industrial waste, paper pulp or mixtures, whether they be biological, chemical or mineral-based products.

A belt filter system is known which uses two endless belts where one is located fully above the other and each belt is driven so that they will jointly come together downstream from a loading station whereby to capture and compress to remove further liquid from any retained solids.

To assist in liquid draining from the sludge the belts are manufactured from permeable or porous or woven materials and made from materials such as polyester or polypropylene cloth. The belts may also pass around a number of rollers, in a serpentine manner so as to apply increasing pressure to the sludge trapped between the belts.

The two belts are subsequently separated so that remaining compressed solids either falls or is scraped from one or both of the belts. The lower belt is subsequently passed under the device to return to the sludge feed point, whilst the upper belt passes over the device. Liquid sprays are installed on the return section to clean the belts so they do not become blocked with sludge or solids.

One problem with existing belt filters is that when a liquid sludge of low viscosity is fed onto the lower belt which provides an uppermost receiving surface which is substantially horizontal, the sludge may overflow an edge of the belt.

To overcome this problem, some belt filters are provided with pre-dewatering systems, such as de-watering drums, which remove some of the liquid from the sludge or slurry so as to raise its viscosity before placement on the lower belt. Obviously this all adds to the complexity and therefore cost of the process, as well as the overall cost of such belt filters.

DISCLOSURE OF THE INVENTION

In one form the invention can be said to reside in an arrangement for effecting separation of liquid from solids or solids from liquid and including a frame supporting a belt or belts held by and between rollers with drive means so as to progress each belt through a collection zone to a compression zone, where at the collection zone the belt or belts are positioned and orientated and shaped and caused to be changed in shape from an upstream position to a downstream position, providing thereby a supporting shape for liquid, one part of which shape is defined at a downstream location by a coming together of facing surfaces of one or more of the belts.

In preference the supporting shape is achieved by arranging that there is one belt only and this is supported so as to be caused to change its shape as it progresses through the collection zone from an approximately planar shape to one where the belt is folded to have the previously upper surface on one side of the belt being pushed together with the previously upper surface on an opposite side of the belt.

In preference the supporting shape is achieved by arranging that there is one belt only and this is supported so as to be caused to change its shape as it progresses through the collection zone from an approximately planar shape which is supported so as to provide a substantially horizontal alignment of its upper most surface when viewed in a lateral direction to one where the belt is folded to have the previously upper surface on one side of the belt being pushed together with the previously upper surface on an opposite side of the belt so that the respective upper surfaces of the sides are aligned to be approximately vertical at the nipping alignment and where the lowermost sides of the belt at the nipping location are at a height that is lower than the upper surface at the commencement of the collection zone.

In preference the belt is a single endless belt.

In preference the system is such that the belt is folded on itself to provide a pressure deliquifying or nipping compression zone through which captured solids from a loaded slurry are progressively compressed so as to cause the solids to be increasingly deliquified.

In preference the belt in its unfolded state is supported to be aligned, in a lateral direction, substantially horizontally, and aligned in a substantially upright orientation when folded upon itself.

This allows the belt to form and be positioned to form a collection or supporting shape to hold liquid slurry which has a liquid component. In use the orientation is such that the belt upper surface will progress substantially downwardly into a compression zone so that liquid slurry is likely to be retained within the upwardly open cavity shape that is then provided. If the slurry or other material to be separated is then poured into this shape, the amount of liquid that can be held without this overflowing is defined by the size of the cavity and this can then be designed to be substantial.

Further, the slurry level can be kept high within the cavity so that the full width of the compressing surfaces can be used for compression. Further, the level of slurry within the cavity can be easily monitored so that there can be an automatic feed of slurry into the cavity in response to changes in the level of slurry detected. However in another case the level is established and maintained by simply limiting the amount of the material being fed into the supporting shape.

In preference, the belt filter further includes guides supporting the belt when progressing from the unfolded to the folded position.

This assists to ensure that the belt or belts where there are more than one does or do not greatly deform out of shape under any weight of slurry, as well as to assist in the tracking of the belt or belts.

In preference, the belt filter further includes guides adapted to support the belt when changing from the folded state into the unfolded state.

In preference, the belt or belts is or are constructed at least in part of a porous, open woven, or permeable material or are arranged to support a filter medium to provide a screening of the liquid in accord with selected criteria. This allows liquid to drain through or past the belt or belts and be removed from the slurry to be deliquified.

In preference, the belt is formed and of a material so as to allow for repeated folding lengthwise along a central fold alignment. In this way, belt wear and tear can be reduced. Such a form and material can be such as to have the medial part somewhat more pliable than a remainder of the belt.

In preference, said belt filter further includes a scraper adapted to scrape the deliquified slurry from said belt.

In preference when the belt is folded upon itself it passes around a plurality of rollers so arranged to result in the belt progressively passing around smaller and smaller diameters of roller.

In preference, the folded belt may first pass through a set of pinch rollers adapted to cause a compression of said slurry. This allows slurry such as a mixture of sand and water to be deliquified.

In preference one or more of said rollers are constructed of a variable diameter along their longitudinal axis so as to ensure that the belt is guided around said rollers.

Furthermore, the rollers may preferentially be of a slotted or perforates type allowing for exudate to also pass through the side of a folded belt against the roller when being nipped. This construction also can assist in self-cleaning of the rollers.

In preference said rollers are slidably adjustable so as to enable said belt to be adjusted in its tensioning around said belt filter. This may also assist in the tracking of the belt.

Preferentially the belt filter includes cleaning means including in one case a washing spray so arranged to direct a stream of water onto said belt to effect a cleaning. In another case, there is an air spray used and in another case there is a combination of air and water used. In a further case there is provided a vibrator which can also be used in combination with the other forms of cleaning.

In a further form of the invention there is provided a belt for use with the belt filter as described above. One of the characteristics of the belt is that it shall fold flat or substantially flat at a nipping location. This requires a different characteristic at a middle lengthwise alignment of the belt than the remainder of the belt namely that this shall be sufficiently pliable for the purpose whereas the remainder of the belt should be relatively stiff.

In preference then there is provided a filter belt for this application which has a medial part which is more pliable than remaining parts of the belt.

In preference, said belt filter includes additional support means such as internal wires embedded around the edges of said belt to provide support for the belt and any additional weight that it carries.

In a further form the invention can be said to reside in a method of drying sludge or slurry type materials which comprises placing materials to be pressed on a belt portion then conveying the belt portion to a folding zone where a middle of the belt is lowered below the respective two sides of the belt, and effecting a compression by urging the respective upper surfaces of the sides one against the other to thereby apply pressure to material there between.

DESCRIPTION OF EMBODIMENTS

To better understand the invention it will now be described with reference to preferred embodiments which will be described with the assistance of drawings wherein:

FIG. 12 is a perspective view of only the belt and rollers of the fourth embodiment; and FIG. 13 is a schematic drawing illustrating a deflection test arrangement to establish comparative deflectivity of sides of a belt as compared to a middle portion of the belt.

Figure 1:
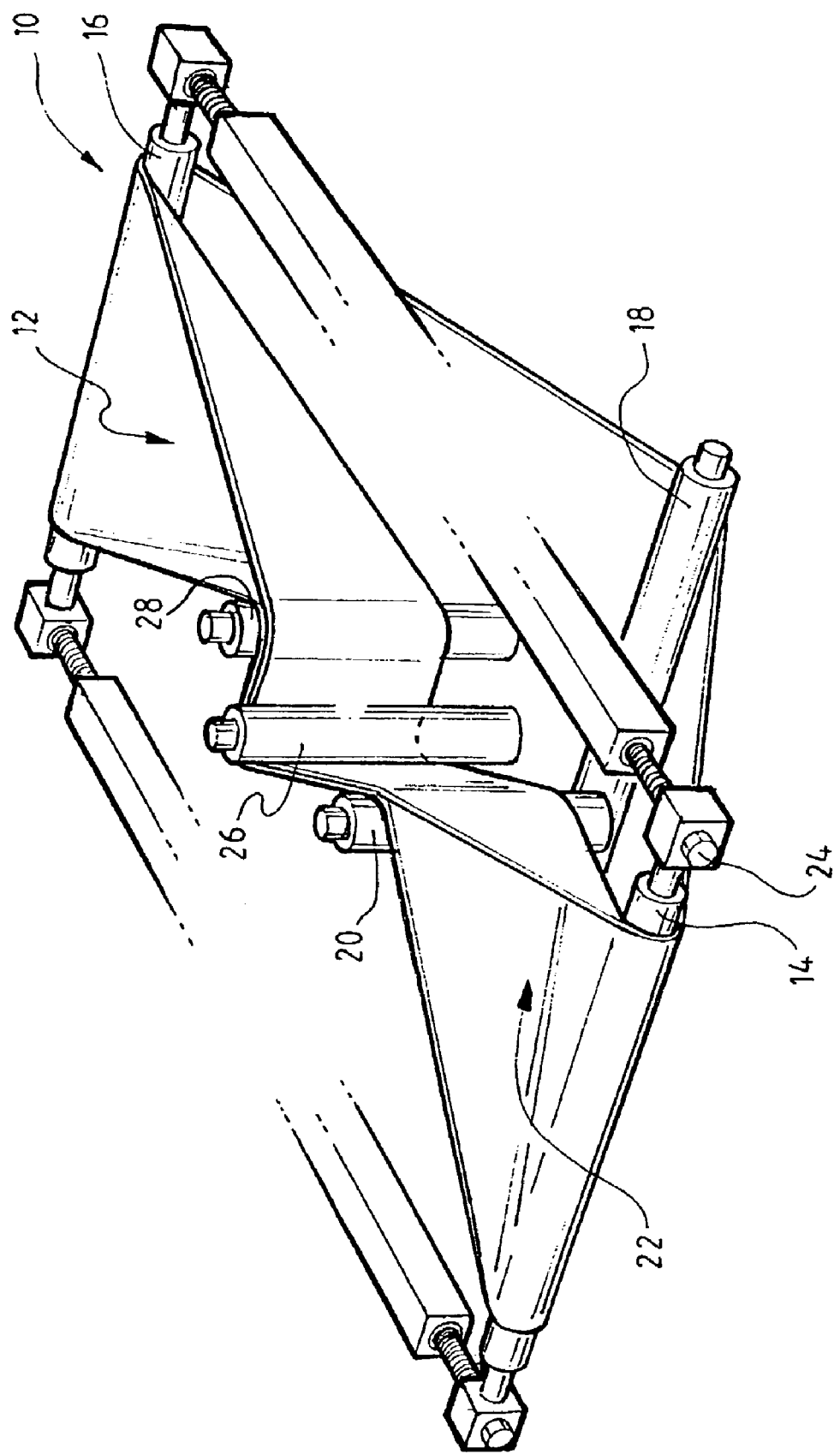
FIG. 1 is a perspective view of a first embodiment of the invention.
Figure 2:
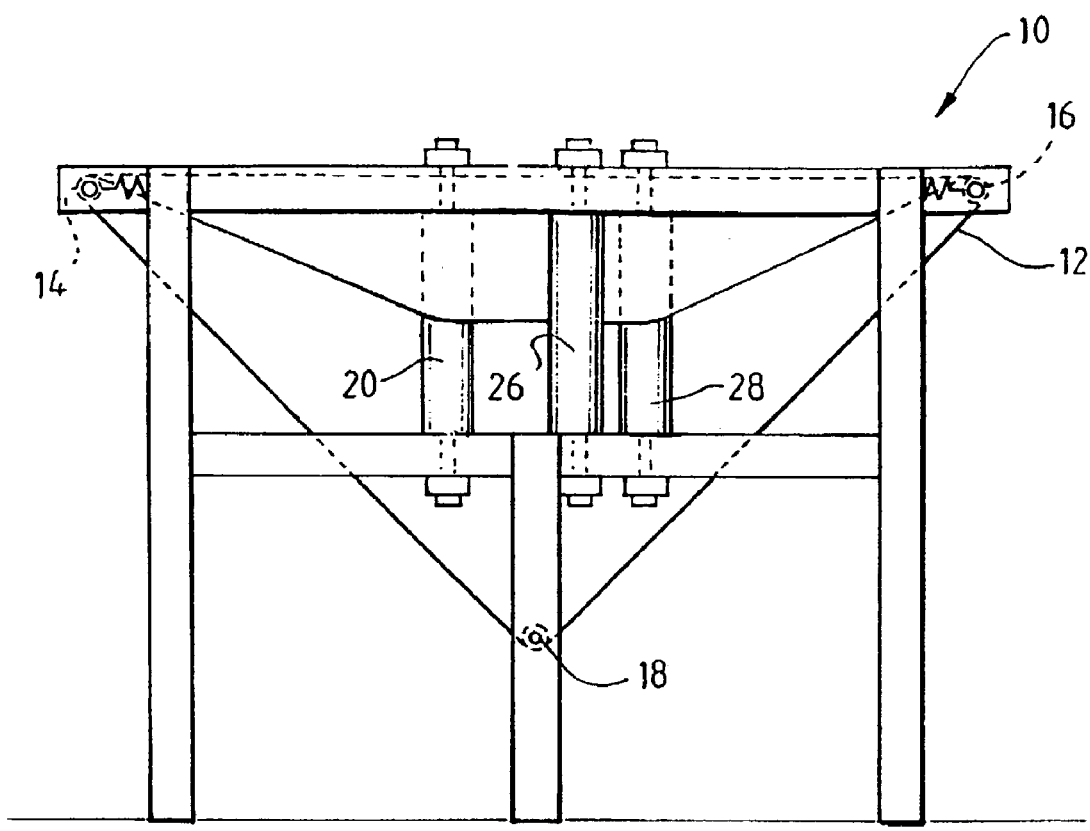
FIG. 2 is a side cross sectional view of the first embodiment as shown in FIG. 1.
Figure 3:
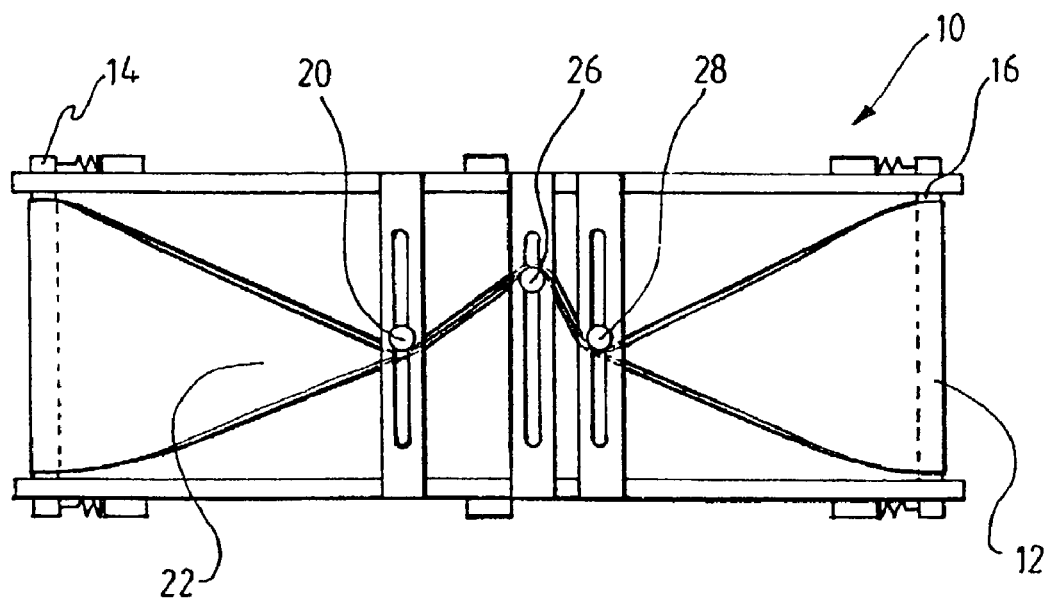
FIG. 3 is a top view of the first embodiment as shown in FIG. 1.
Figure 4:
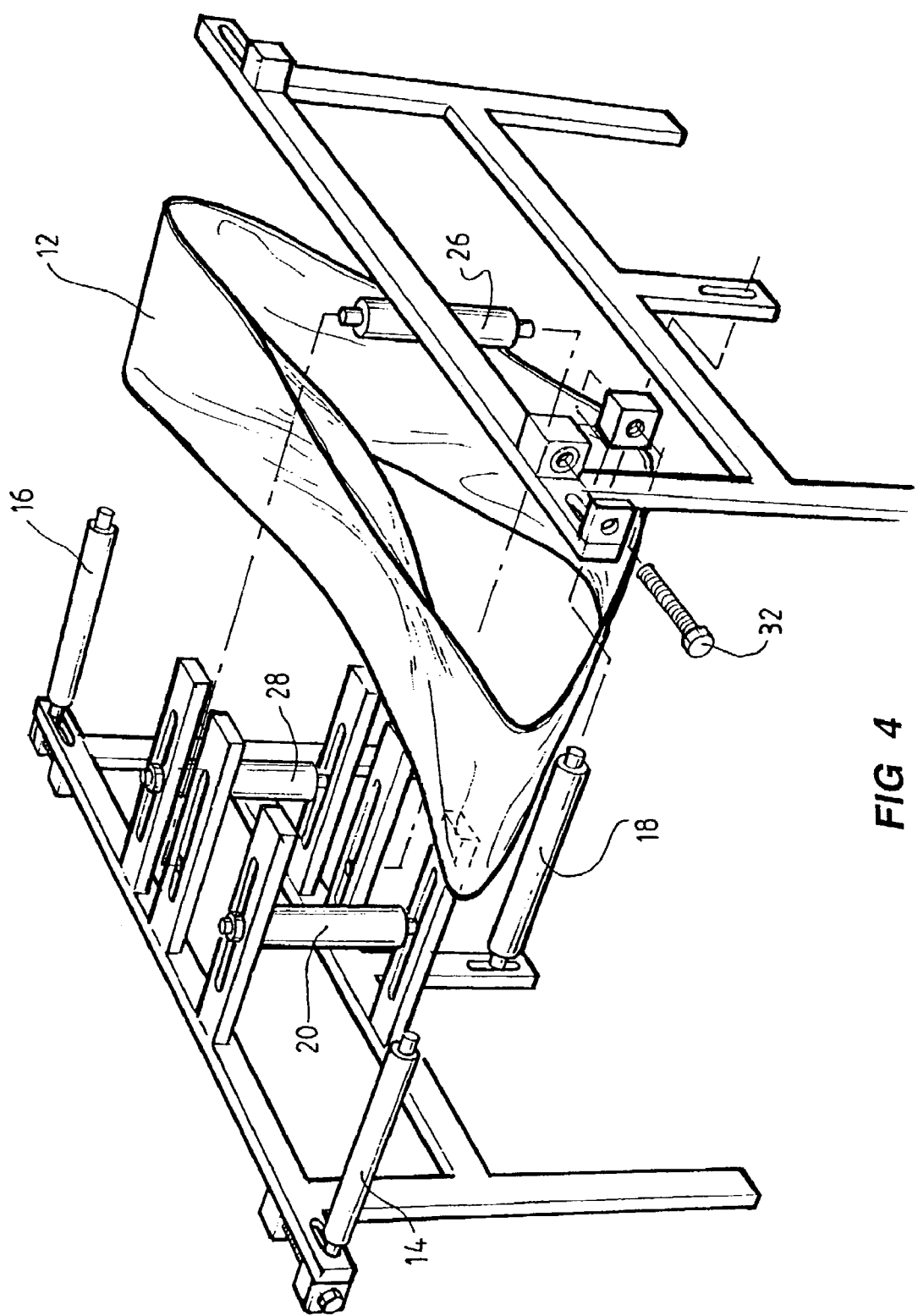
FIG. 4 is an exploded perspective view of the first embodiment as shown in FIG. 1.

Referring to the first embodiment as shown FIG. 1 through to FIG. 4 a belt filter 10 has a continuous endless filter belt 12 which is supported and arranged to be driven around rollers 14, 16 and 18 by one of the rollers. The belt 12 is positioned to extend substantially horizontally around rollers 14, 16 and below roller 18. The belt 12 is further supported so as to fold upon itself about a middle part of the belt 12 as it proceeds to roller 20.

In this way, the belt 12 defines between the respective rollers 14 and 20 a supporting cavity or area 22 within which can be placed a liquid sludge or slurry to thereby define a working volume.

Accordingly, between rollers 14 and 20 the belt 12 changes from a substantially horizontal orientation to an orientation that is substantially upright with the edges of the belt being at approximately the same height but with the middle of the belt being lowered to therefore provide that the cavity 22 is an upwardly open shape with a vertical compression zone forming a part of the wall defining the cavity shape.

The belt 12 is driven by the drive means to move around roller 14. Material to be filtered and deliquified is fed into the cavity 22. Slurry that behaves like low viscosity fluid flows to fill the cavity and is initially constrained within it by the shape formed by the belt 12. The belt 12 is made from a suitably permeable material that allows some of the liquid to flow through it but also to build up a filtering effect from retained solids.

Thereby, the cavity 22 becomes the first deliquifying zone where some of the liquid drains through the filter belt by gravity to be collected by a suitable means such as a tray (not shown) under cavity 22. The height of liquid in the cavity 22 can be measured and maintained by level measuring means such as a float controlled valve which is used to control an extent of further introduction of slurry into the cavity 22. Further, because the cavity can be kept substantially full, the amount of liquid being drained can be automatically kept to a maximum and further therefor, the amount of slurry or at least solids from the slurry being engaged between engaging nipping surfaces of the belt can also be kept to a maximum level.

The convergence of the sides of the belt in cavity 22 causes the material wedged between the belt sides to be compressed on its approach to roller 20 which assists to deliquify the material. Further deliquifying is effected as the belt 12 is caused to pass around roller 20 and further around rollers 26 and 28. The material that is captured within the folded belt experiences compression and shear that causes more liquid to pass through the belt to be collected by a suitable means such as a tray (not shown) beneath these rollers.

The two sides of the belt are then unfolded to change from being in a substantially upright position to being substantially horizontal. The deliquified solids materials are then carried over roller 16 and fall or are scraped by a scraper (not shown) from the belt.

One of the problems with an arrangement using a single belt is that the distance between respective parts of the belt from where it passes over a first horizontal and straight roller to where the belt is folded upon itself is not the same. This has meant that in practice there can be some curvature associated with folding a belt between the respective locations. Fortunately when a curvature occurs the curvatures that result assist the process of capture of solids into the nip.

In particular, there are advantages where there are a bulging of facing surfaces between the edges and the folded middle at the first nipping location. This allows for a more complex shape to develop which is tighter at both an upper and lower end than in the middle but this is found to allow for more solid material to enter the nipping area and to be held against side protrusion.

Other embodiments may equally well be used to improve the efficiency of the invention.

FIG. 4 shows simple slides for adjustment of the position and angle of rollers 14, 16, 18, 20, 26 and 28. This offers a method to adjust the tension on the belt and to adjust the tracking of the belt so it maintains a selected path around the rollers 14, 16, 18, 20, 26 and 28. A screw 32 allows more precise adjustment of the tension and tracking of the belt.

Figure 5:
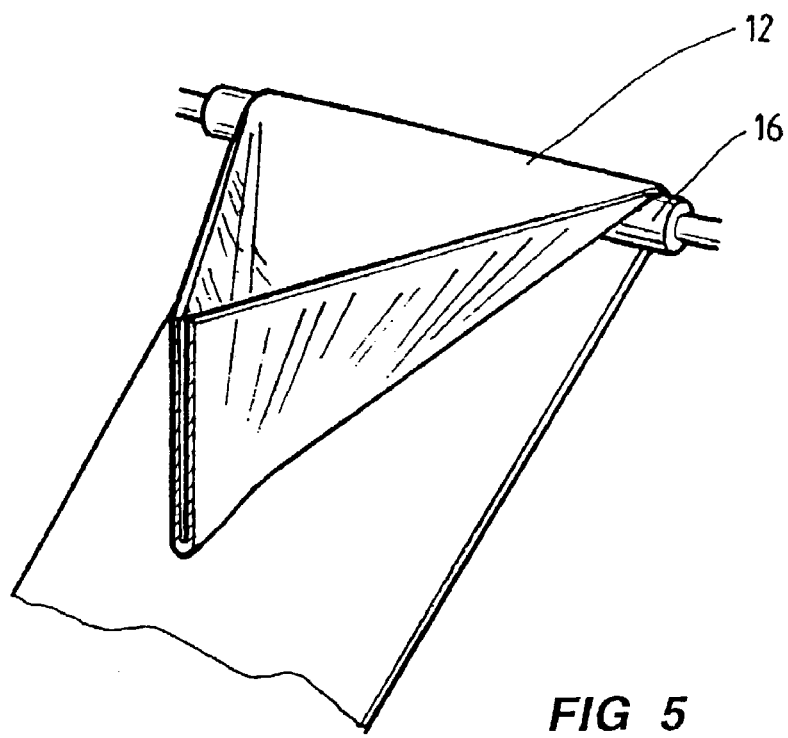
FIG. 5 is a partial perspective view showing the folding of the belt.
Figure 6:
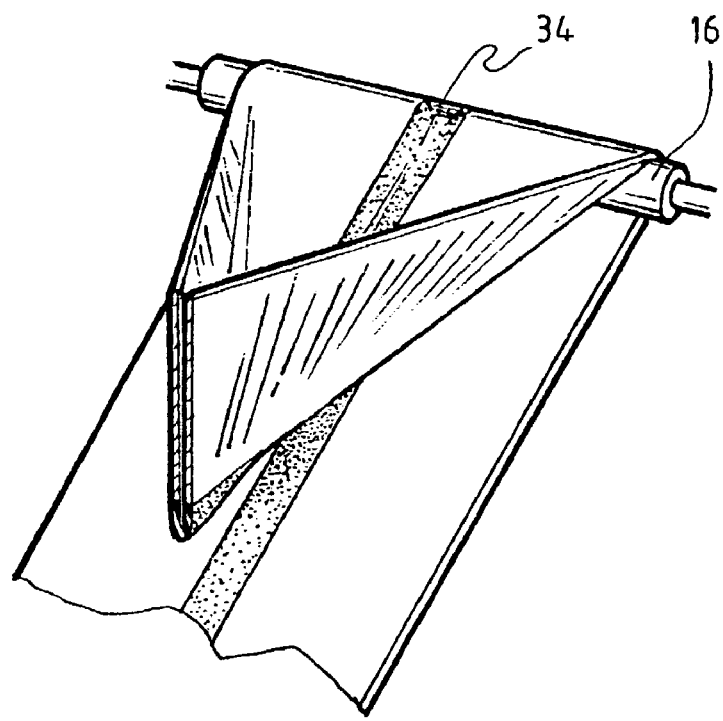
FIG. 6 is a partial perspective view showing the reinforcing of the belt.

FIGS. 5 and 6 show a belt that may be used in this invention. FIG. 5 shows the belt when it is in a folded upright position. FIG. 6 shows an embodiment of the apparatus whereby the belt is suitably reinforced in the center or the center flexing section is replaced by a more suitable flexible material, such as plastic or rubber, with the final choice of material dependent on application. Reinforcing may also equally well be applied to the sides or edges of the belt (not shown).

The compressive and shear forces on the material within the belt affect the efficiency with which material is deliquified. These forces depend upon many factors predominantly belt tension but also the diameter of the vertical rollers, and their relative positions have influence. The number of vertical rollers also has a bearing on the efficiency of the deliquifying.

Figure 7:
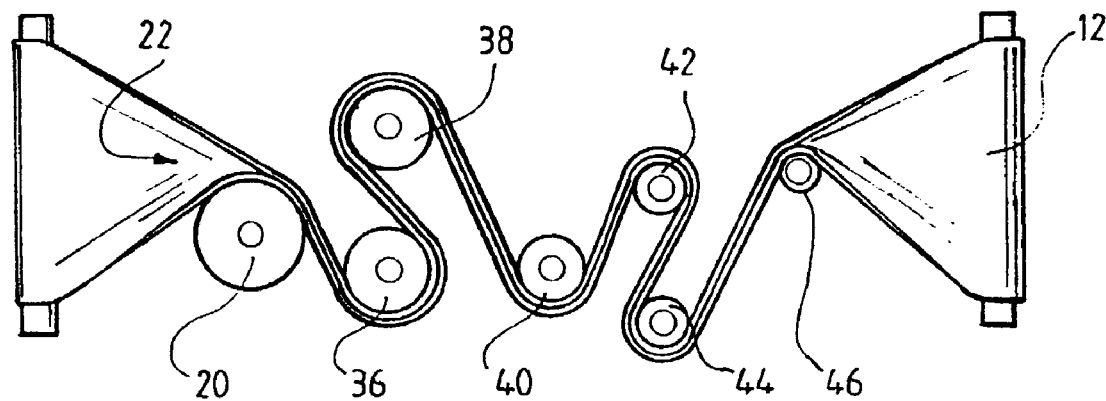
FIG. 7 is a second embodiment of the invention.

FIG. 7 shows an embodiment of the apparatus whereby vertical rollers of different diameters are used, and they are placed in various relative positions. Feed material is transferred into cavity 22 where it is deliquified by gravity and compressed as the belt folds on itself and moves towards roller 20. In some applications roller 20 may be the only roller necessary (such as the deliquifying of sand). However, most applications will require more than the one roller to achieve the desired efficiency. FIG. 7 thus shows an embodiment of a folding belt filter employing some 7 vertical rollers. It is to be understood that this invention though is not limited to any particular number of vertical rollers or their relative size and spacing.

Figure 8:
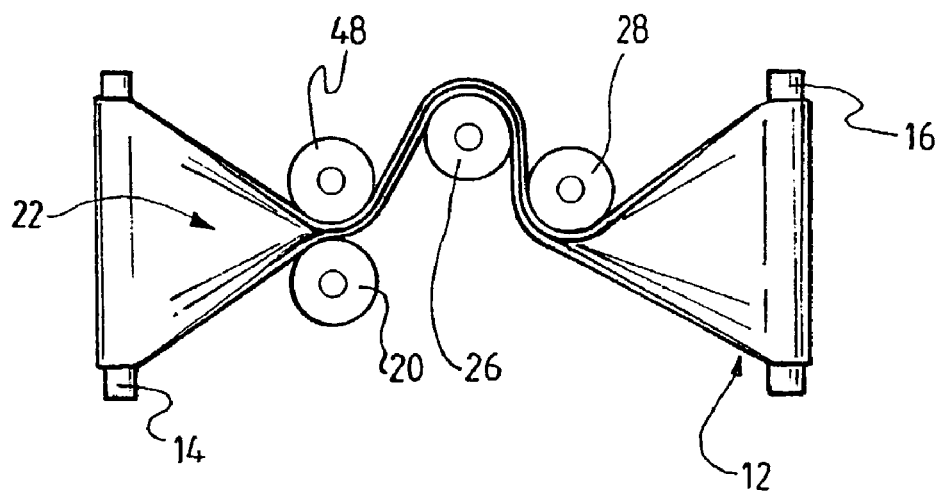
FIG. 8 is a partial perspective view of a third embodiment of a belt.
Figure 9:
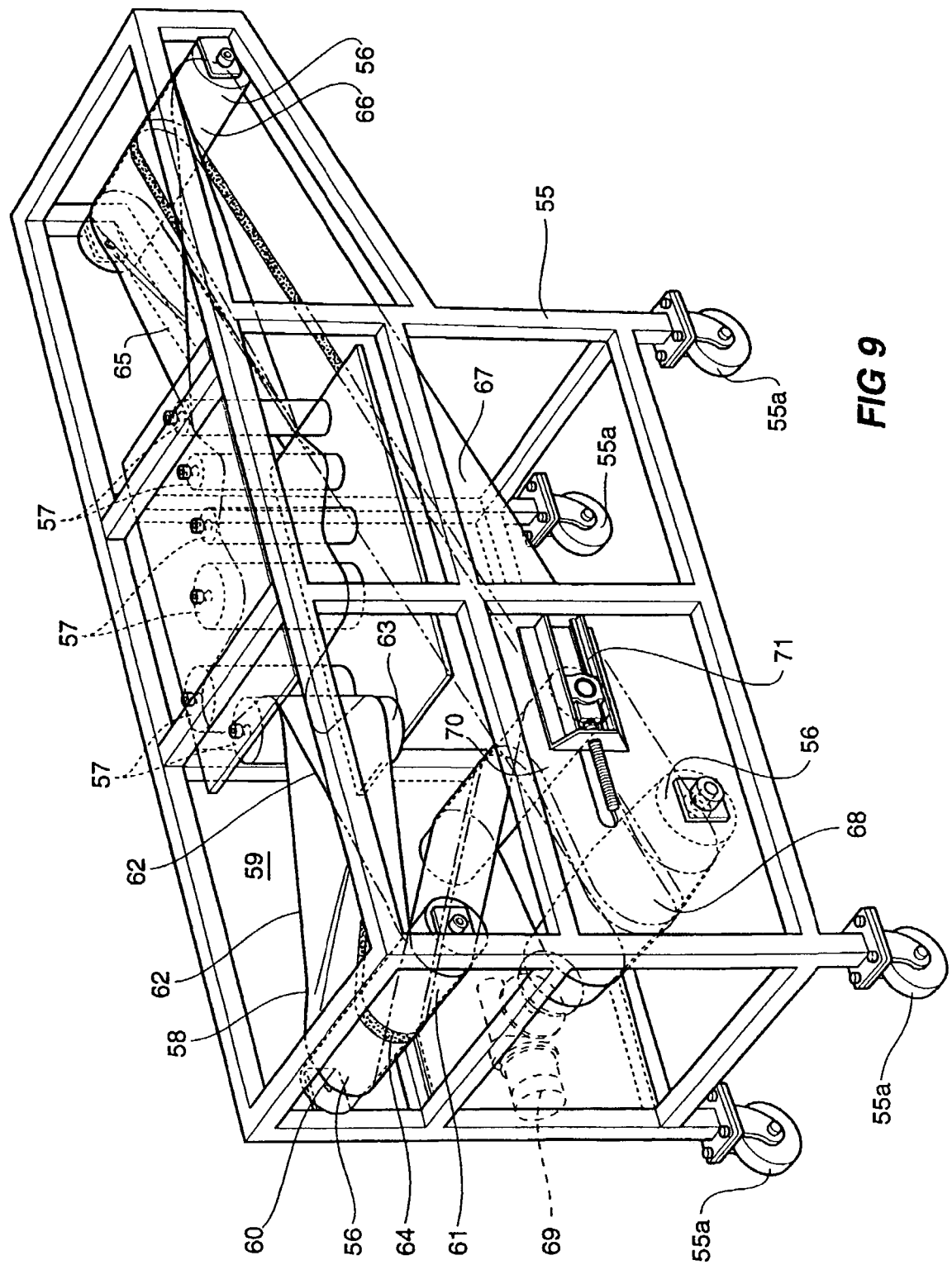
FIG. 9 is a perspective view of a fourth embodiment without collection trays.
Figure 10:
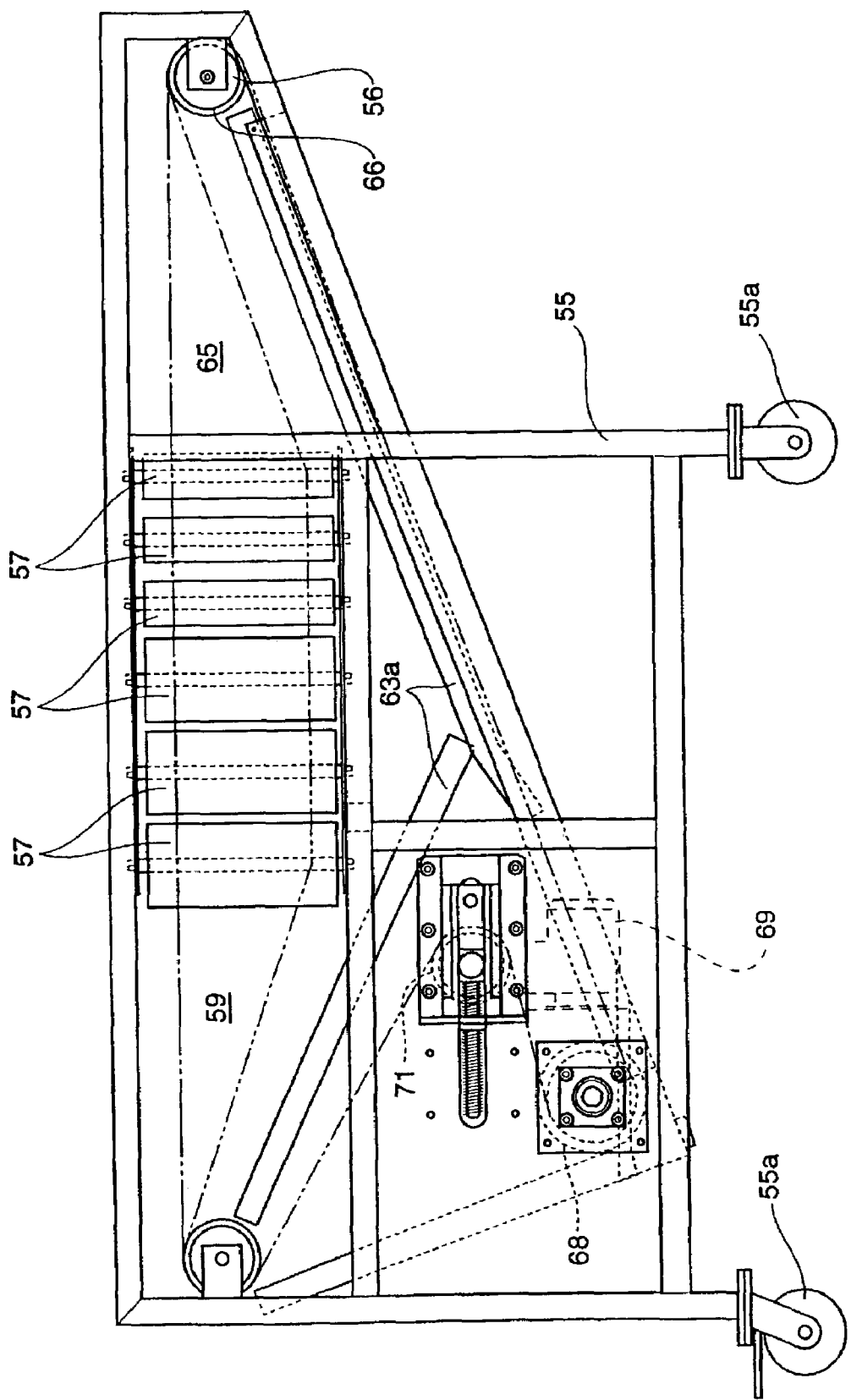
FIG. 10 is a side elevation of the fourth embodiment as shown in FIG. 9 with the addition of collection trays and the belt being shown in outline.
Figure 11:
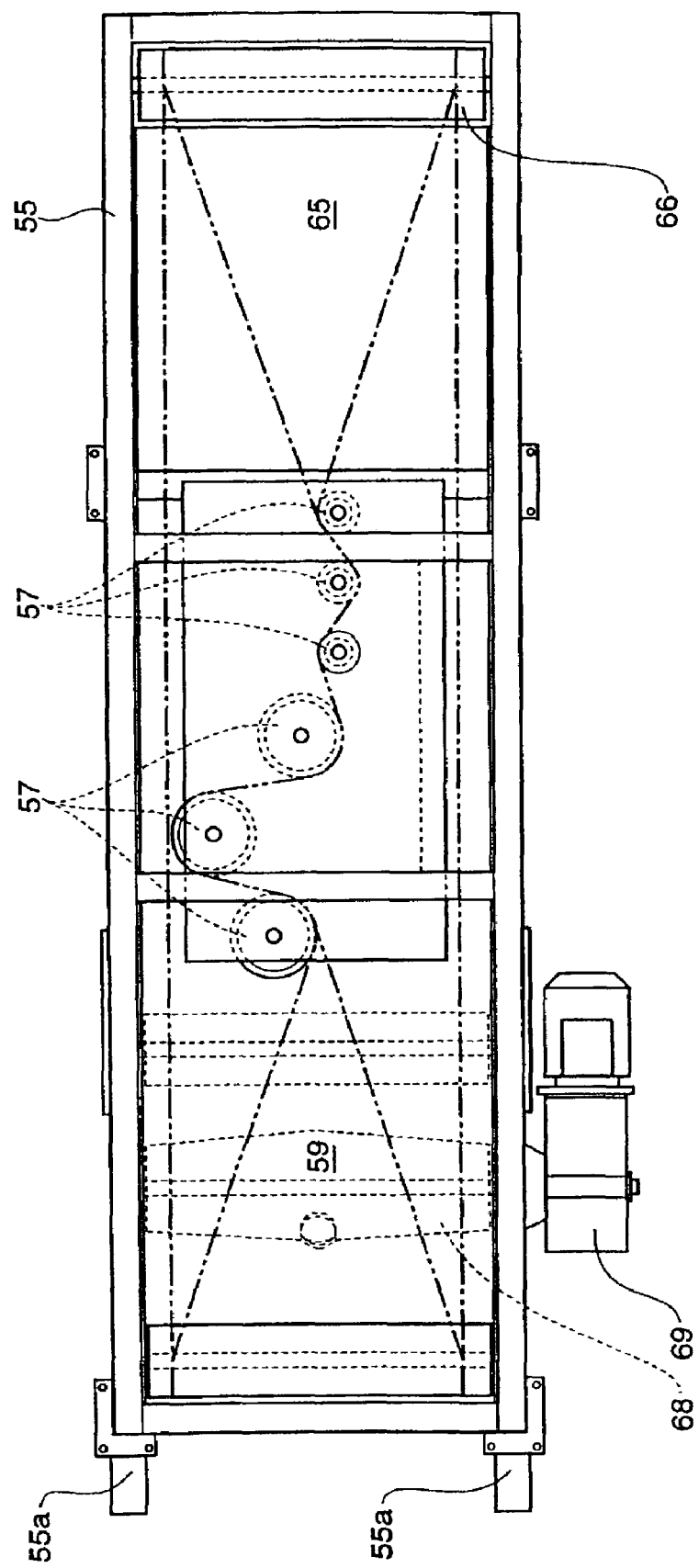
FIG. 11 is a plan view of the fourth embodiment, with the belt and some rollers being shown in dotted outline.

FIG. 8 shows a further embodiment of the invention whereby roller 48 assists the vertical distribution of material within the belt. Heavier solids in the material to be deliquified at times may settle to the bottom of the cavity 22. This can place an unnecessary strain near the fold of the belt as it moves around the vertical rollers and the heavy material tends to bulge the belt where it accumulates near the fold. Roller 48 acts in combination with roller 20 to form a pair of pinch rollers that smooth the profile of the material constrained within the folded belt thereby reducing the strain on sections of the belt, improving the tracking of the belt and raising deliquifying efficiency of some materials.

Now referring to FIGS. 9 through 12 there is shown a more developed machine than in the previous first embodiment and accordingly there is shown a frame 55 with ground engaging supporting wheels 55*a* which supports a plurality of rollers 56 and 57 which control the passage of belt 58 through respective zones. A first zone 59 is a collection zone where the belt 58 is caused to change its shape from a planar belt to a belt that is folded together to have previously uppermost surfaces of sides 60 and 61 engage substantially against each other to effect a nipping compression effect thereby. This zone 59 has therefore the endless belt 58 shaped so as to provide an uppermost open cavity into which liquids (containing solids to be separated) can be poured.

With a shape such as this with a level of the surfaces of the belt 58 at an introduction to the zone 59 being substantially maintained by edges 62 of the belt up to the nipping zone 63 the level of liquid which will contain the solids to be separated can be kept high and therefore increase efficiency of any separation effect.

The belt 58 has two sides 60 and 61 separated by a middle portion 64 which is more pliable than the sides 60 and 61 so that the belt 58 will easily and without damage fold about this middle portion as it is driven into the nipping zone 63.

The nipping zone 63 includes a plurality of rollers 57 which are approximately vertically aligned or at least they have their axes at 90 degrees to that of the other rollers. Beneath the respective zones are collection trays shown as 63*a* especially in FIG. 10.

Subsequent to the nipping zone 63 the belt 58 is then unfolded at the unfolding zone 65 where solids that have been subjected to compressing forces are now relieved of these. The result is that the belt 58 will now carry compressed solids on either one or both sides which will then carry over to the end most lateral roller of the group at 66. It is here that a scraper is most conveniently located to remove the compressed solids.

The belt 58 then continues through a cleaning zone 67 where a water spray (a combination of air and water can be also used) which is not specifically shown will be positioned to force water back through the weave of the belt 58 to clean this of retained finer particles. The belt 58 then passes around drive roller 68 with drive motor 69 and tightener roller 70. This roller 70 is adjustable through adjuster 71.

The roller 68 has a camber to assist in keeping the belt 58 in line through its path. Selection of appropriate types of belt which are generally know and referred to as filter belts will also assist as will the selection of an appropriate pliable middle portion. Such selection goes also to selection of joining arrangements so that a join can be sealed off to ensure that liquid does not pass uninterrupted there through.

Finally in FIG. 13 there is shown a simple cantilever test rig where a piece of a side of the belt of 300 mm width of a type as chosen for the embodiment is subject to a weight at a distance. The distance from the clamp to the end of the belt material is 150 mm, the weight is 100 grams and the deflection as a result of the weight is 46 mm. The fabric is a monofilament polyester 830 grams/squ meter, 24×8 threads/cm, 7×1 satin weave.

The middle portion "hinge" fabric has been chosen as a staple spun yarn polypropylene 400 gm/sq meter, 17×10 threads/cm, 2×2 twill weave. This has been subjected to the same test as with the side material but is so pliable as to fall to virtually its full length vertically downward under its own weight.

Although not shown, further attachments may be made to the folding belt filter. These include a scraper to remove sludge from the belt when deliquifying is completed; perforated or slotted rollers to improve deliquifying efficiency; and liquid or air sprays to wash accumulated material form the belt as it returns to the feed section of the apparatus so the belt will be reusable which is to say remains permeable.

Thus one can see that the above invention can be achieved with one belt in contrast to existing applications which require two belts. The use of one belt in this invention can reduce the complexity of the device and furthermore by causing the belt to fold upon itself in a relatively upright position minimises side dripping of sludge and leads to a greater efficiency of the deliquifying system.

However in a further embodiment the belt comprises two belts which are arranged to track side by side and there is a filter material which extends across both belts and provides a joining together along a medial lengthwise alignment of the two otherwise separate belts. This can be considered to also be therefore a single belt although the construction is comprised of in the main the two separate laterally stiff belt elements that are joined by a further part which provides a filter characteristic and is pliable to an extent that the folding flat repeatedly requirement without damage can also be accommodated.

The invention claimed is:

1. A belt for use with an apparatus for effecting separation of liquid from solids or solids from liquids comprising:
    a first side (60);
    a second side (61);
    a middle portion (64) coupled between said first side and said second side and wherein said middle portion is configured to fold to allow side first side and said second side to become oriented in a vertical plane near one another wherein said belt is not damaged when folded about said middle portion when said middle portion is driven into a nipping zone (63);
    said first side, said second side and said middle portion configured into a single endless belt (58);
    said first side, said second side and said middle portion configured from porous material; and,
    said middle portion configured from a material more pliable than said first side and said second side wherein said first side and said second is configured to deflect partially toward a vertical orientation when placed in a horizontal orientation in a cantilever test rig and wherein said middle portion is configured to deflect virtually fully to said vertical orientation when placed in said horizontal orientation in said cantilever test rig.

2. The belt of claim 1 wherein first side and said second side are constructed from polyester.

3. The belt of claim 1 wherein first side and said second side are constructed from monofilament polyester.

4. The belt of claim 1 wherein first side and said second side are constructed from monofilament polyester having 830 grams per square meter, 24×8 threads per centimeter in a 7×1 satin weave.

5. The belt of claim 1 wherein middle portion is constructed from polypropylene.

6. The belt of claim 1 wherein middle portion is constructed from staple spun yarn polypropylene.

7. The belt of claim 1 wherein middle portion is constructed from staple spun yarn polypropylene having 400 grams per square meter, 170×10 threads per centimeter in a 2×2 till weave.

8. A belt for use with an apparatus for effecting separation of liquid from solids or solids from liquids comprising:
    a first side (60);
    a second side (61);
    said first side and said second side constructed from polyester;
    a middle portion (64) coupled between said first side and said second side and wherein said middle portion is configured to fold to allow side first side and said second side to become oriented in a vertical plane near one another wherein said belt is not damaged when folded about said middle portion when said middle portion is driven into a nipping zone (63) wherein said middle portion is constructed from polypropylene;
    said first side, said second side and said middle portion configured into a single endless belt (58);
    said first side, said second side and said middle portion configured from porous material; and,
    said middle portion configured from a material more pliable than said first side and said second side wherein said first side and said second is configured to deflect partially toward a vertical orientation when placed in a horizontal orientation in a cantilever test rig and wherein said middle portion is configured to deflect virtually fully to said vertical orientation when placed in said horizontal orientation in said cantilever test rig.

9. A belt for use with an apparatus for effecting separation of liquid from solids or solids from liquids comprising:
    a first side (60);
    a second side (61);
    said first side and said second side constructed from monofilament polyester having 830 grams per square meter, 24×8 threads per centimeter in a 7×1 satin weave;
    a middle portion (64) coupled between said first side and said second side and wherein said middle portion is configured to fold to allow side first side and said second side to become oriented in a vertical plane near one another wherein said belt is not damaged when folded about said middle portion when said middle portion is driven into a nipping zone (63) wherein said middle portion is constructed from staple spun yarn polypropylene having 400 grams per square meter, 170×10 threads per centimeter in a 2×2 till weave;
    said first side, said second side and said middle portion configured into a single endless belt (58);
    said first side, said second side and said middle portion configured from porous material; and,
    said middle portion configured from a material more pliable than said first side and said second side wherein said first side and said second is configured to deflect partially toward a vertical orientation when placed in a horizontal orientation in a cantilever test rig and wherein said middle portion is configured to deflect virtually fully to said vertical orientation when placed in said horizontal orientation in said cantilever test rig.

\* \* \* \* \*